US012654996B2

(12) United States Patent
Liu et al.

(10) Patent No.: US 12,654,996 B2
(45) Date of Patent: Jun. 16, 2026

(54) AUTOMATIC CONVEYING DEVICE, METHOD FOR DETERMINING THE PRESENCE OF EXTERNAL OBJECTS, AND AUTOMATIC START METHOD

(71) Applicant: Otis Elevator Company, Farmington, CT (US)

(72) Inventors: Wentong Liu, Hangzhou (CN); Lifei Cheng, Hangzhou (CN); Zhaoxia Hu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 201 days.

(21) Appl. No.: 18/512,990

(22) Filed: Nov. 17, 2023

(65) Prior Publication Data

US 2024/0417221 A1 Dec. 19, 2024

(30) Foreign Application Priority Data

Jun. 16, 2023 (CN) ......................... 202310721646.8

(51) Int. Cl.
*B66B 29/00* (2006.01)
*B66B 21/04* (2006.01)
(Continued)

(52) U.S. Cl.
CPC .............. *B66B 29/00* (2013.01); *B66B 21/04* (2013.01); *B66B 21/10* (2013.01); *B66B 25/003* (2013.01)

(58) Field of Classification Search
None
See application file for complete search history.

(56) References Cited

U.S. PATENT DOCUMENTS 9,896,309 B2 * 2/2018 Wang ........................ G01V 8/12
10,059,569 B2 * 8/2018 Fang ........................ B66B 29/08
(Continued)

FOREIGN PATENT DOCUMENTS

CN 212425087 U * 1/2021
CN 113932851 A 1/2022
(Continued)

OTHER PUBLICATIONS

Cedes, "TOF/Start—a solution that really works" available at: https://www.cedes.com/en/news-archive/tof-start-a-solution-that-really-works/, dated Mar. 30, 2020, 2 pages.
(Continued)

*Primary Examiner* — Gene O Crawford
*Assistant Examiner* — Muhammad Awais
(74) *Attorney, Agent, or Firm* — CANTOR COLBURN LLP

(57) ABSTRACT

An automatic conveying device, a method for determining the presence of an external object, and an automatic start method. The automatic conveying device includes a first end and a second end opposite to each other; and a middle section between the first end and the second end; the automatic conveying device further including one or more first detection devices arranged on one or both sides of the automatic conveying device, each first detection device has a detection range that is substantially a plane area, and the detection range of each first detection device covers at least a portion of the middle section; and a processor connected to the one or more first detection devices, and configured to determine, based at least partially on signals detected by the one or more first detection devices, whether an external object is present on the automatic conveying device.

14 Claims, 4 Drawing Sheets

(51) Int. Cl.

| | |
|---|---|
| ***B66B 21/10*** | (2006.01) |
| ***B66B 25/00*** | (2006.01) |

(56) References Cited

U.S. PATENT DOCUMENTS

| | | | | |
|---|---|---|---|---|
| 10,071,884 | B2 * | 9/2018 | Li | B66B 29/06 |
| 10,259,685 | B2 * | 4/2019 | Fuchs | B66B 29/005 |
| 10,282,847 | B2 | 5/2019 | Li et al. | |
| 10,479,653 | B2 | 11/2019 | Li et al. | |
| 11,254,545 | B2 | 2/2022 | Juliana et al. | |
| 11,407,618 | B2 * | 8/2022 | Fan | B66B 27/00 |
| 2005/0088520 | A1 | 4/2005 | Wiesinger et al. | |

FOREIGN PATENT DOCUMENTS

| | | | | | |
|---|---|---|---|---|---|
| DE | 202019104596 | U1 | | 9/2019 | |
| EP | 3140235 | B1 | | 10/2021 | |
| JP | 3400669 | B2 | | 4/2003 | |
| JP | 5788848 | B2 | * | 10/2015 | |
| JP | 2016185856 | A | * | 10/2016 | |
| JP | 7224516 | B1 | | 2/2023 | |
| KR | 20100104230 | A | * | 9/2010 | B66B 29/00 |
| WO | WO-2004035453 | A1 | * | 4/2004 | B66B 25/00 |
| WO | WO-2010123489 | A1 | * | 10/2010 | B66B 29/005 |
| WO | 2022200672 | A1 | | 9/2022 | |

OTHER PUBLICATIONS

European Search Report for Application No. 24181244.5, Issued Oct. 21, 2024, 10 Pages.

* cited by examiner

21

AUTOMATIC CONVEYING DEVICE, METHOD FOR DETERMINING THE PRESENCE OF EXTERNAL OBJECTS, AND AUTOMATIC START METHOD

FOREIGN PRIORITY

This application claims priority to Chinese Patent Application No. 202310721646.8, filed Jun. 16, 2023, and all the benefits accruing therefrom under 35 U.S.C. § 119, the contents of which in its entirety are herein incorporated by reference.

FIELD OF THE INVENTION

The present invention relates to the field of automatic conveying devices, in particular to a method for detecting the presence of an external object on an automatic conveying device and an automatic start method for an automatic conveying device.

BACKGROUND OF THE INVENTION

Automatic conveying devices such as escalators and moving walkways are generally started manually. In places with a large number of automatic conveying devices, such as in large shopping malls or airports, it is tedious to start the automatic conveying devices one by one. It is expected that the automatic conveying devices can be started automatically. For safety purposes, it is necessary to ensure that there are no external objects such as passengers, pets, or goods on the automatic conveying devices before the automatic start.

It is conceived that various sensors are to be used to achieve this objective. For example, when using camera devices, it is necessary to determine, either using image algorithms or through judgement by people, whether there are external objects on the automatic conveying device. In addition, if it is expected to cover the entire carrying range of the automatic conveying device, multiple cameras are required and the cameras are required to be installed at specific positions. Furthermore, various factors, such as the cameras being blocked, also need to be considered.

Another option is infrared light curtain, which consists of a plurality of sets of infrared light transmitters and infrared light receivers distributed along the length direction of the skirt panel. A plurality of light transmitters are arranged at certain intervals (e.g., corresponding to the spacing between steps) at the skirt panel on one side, and the corresponding plurality of light receivers are arranged at the skirt panel on the opposite side. When the respective light transmitters are turned on, a light curtain is formed, and when the light is blocked, it is determined that there is an external object on the automatic conveying device. This type of device has a high cost and it is difficult to install the plurality of light transmitters and light receivers along the skirts panels on both sides. In addition, it is difficult to repair or replace the light transmitter(s) or receiver(s) when they malfunction.

SUMMARY OF THE INVENTION

The object of the present application is to solve or at least alleviate the problems existing in the prior art.

According to one aspect, an automatic conveying device is provided, comprising: a first end and a second end opposite to each other; and a middle section between the first end and the second end; wherein, the automatic conveying device further comprises one or more first detection devices arranged on one or both sides of the automatic conveying device, where each first detection device has a detection range that is substantially a plane area, and the detection range of each first detection device covers at least a portion of the middle section; and a processor connected to the one or more first detection devices, and configured to determine, based at least partially on signals detected by the one or more first detection devices, whether an external object is present on the automatic conveying device.

Optionally, in an embodiment of the automatic conveying device, the detection range of one first detection device or a combination of detection ranges of a plurality of first detection devices covers the entire middle section.

Optionally, in an embodiment of the automatic conveying device, the one or more first detection devices are radar units, such as LiDARs, where the detection range of each first detection device is substantially a fan-shaped plane area.

Optionally, in an embodiment of the automatic conveying device, the detection range of each first detection device is parallel to a reference plane of the middle section, and/or a maximum distance between the detection range of each first detection device and the reference plane is less than 1 meter or less than 0.5 meters, where the reference plane of the middle section is a plane where the middle section is located or a plane obtained by connecting leading edges of step boards of the middle section.

Optionally, in an embodiment of the automatic conveying device, the automatic conveying device is a moving walkway with the first end, the second end, and the middle section located in the same plane, where the detection range of one first detection device or the combination of the plurality of first detection devices also covers the first end and the second end of the moving walkway.

Optionally, in an embodiment of the automatic conveying device, the automatic conveying device is an escalator, the automatic conveying device further comprising: one or more second detection devices and one or more third detection devices, where the detection range of the one or more second detection devices is a plane area covering the first end, and the detection range of the one or more third detection devices is a plane area covering the second end.

Optionally, in an embodiment of the automatic conveying device, the one or more second detection devices and the one or more third detection devices are radar units, such as LiDARs, where the detection range of each of the one or more second detection devices and the one or more third detection devices is substantially a fan-shaped plane area.

Optionally, in an embodiment of the automatic conveying device, the processor is configured to determine, based on signals detected by the one or more first detection devices, the one or more second detection devices, and the one or more third detection devices, whether an external object is present on the automatic conveying device.

Optionally, in an embodiment of the automatic conveying device, the one or more first detection devices are arranged inside skirt panels on one or both sides of the automatic conveying device, and the skirt panels comprise transparent window strips extending in a direction parallel to the reference plane, so that the skirt panels do not block the detection range of the first detection device(s).

Optionally, in an embodiment of the automatic conveying device, the first detection device is arranged outer side of the skirt panel(s) on one or both sides of the automatic conveying device and on an outer side of a transparent sideplate on the skirt panel(s).

Optionally, in an embodiment of the automatic conveying device, the processor is configured to determine, upon receiving a start-up command, whether an external object is present on the automatic conveying device, where if no external object is present, the automatic conveying device is started, and if an external object is present, the automatic conveying device is not started.

According to another aspect, a method for detecting the presence of an external object on an automatic conveying device is provided, comprising: arranging one or more first detection devices on one or both sides of the automatic conveying device, where each first detection device has a detection range that is substantially a plane area, and the detection range of each first detection device covers at least a portion of the middle section; and determining, based at least partially on signals detected by the one or more first detection devices, whether an external object is present on the automatic conveying device.

Optionally, the detection range of the one first detection device or the combination of detection ranges of the plurality of first detection devices covers the entire middle section.

Optionally, the method further comprises: covering a first end and a second end of the automatic conveying device with the detection range of one first detection device or the combination of detection ranges of the plurality of first detection devices when the automatic conveying device is a moving walkway.

Optionally, the method further comprises: arranging one or more second detection devices at a first end of the escalator, and arranging one or more third detection devices at a second end of the escalator when the automatic conveying device is an escalator, where the detection range of the one or more second detection devices is a plane area covering the first end, and the detection range of the one or more third detection devices is a plane area covering the second end; and determining, based on signals detected by the one or more first detection devices, the one or more second detection devices, and the one or more third detection devices, whether an external object is present on the automatic conveying device.

According to yet another aspect, an automatic start method for an automatic conveying device is provided, comprising: determining, using the method according to the embodiments of the present invention, whether an external object is present on the automatic conveying device, when a start-up command is received; and starting the automatic conveying device if no external object is pressent, and not starting the automatic conveying device if an external object is pressent.

According to the embodiments of the present invention, a device and method for detecting the presence of external objects on an automatic conveying device in a simple and efficient manner have been achieved.

BRIEF DESCRIPTION OF THE DRAWINGS

With reference to the accompanying drawings, the disclosure of the present application will become easier to understand. Those skilled in the art would easily understand that these drawings are for the purpose of illustration, and are not intended to limit the protection scope of the present application. In addition, in the figures, similar numerals are used to denote similar components, where.

DETAILED DESCRIPTION OF EMBODIMENT(S) OF THE INVENTION

Referring first to FIGS. 1 to 4, an automatic conveying device according to an embodiment of the present invention is shown. It should be appreciated that automatic conveying devices mainly refer to escalators or inclined moving walkways that convey between lower and higher target positions as shown in the figures, or moving walkways that convey between horizontal target positions, or any other similar devices. These devices may include steps or belts as load-bearing devices. It should be appreciated that although an escalator is used as an example herein, those skilled in the art can apply the same or similar devices to other automatic conveying devices based on the same principles.

Figure 3:
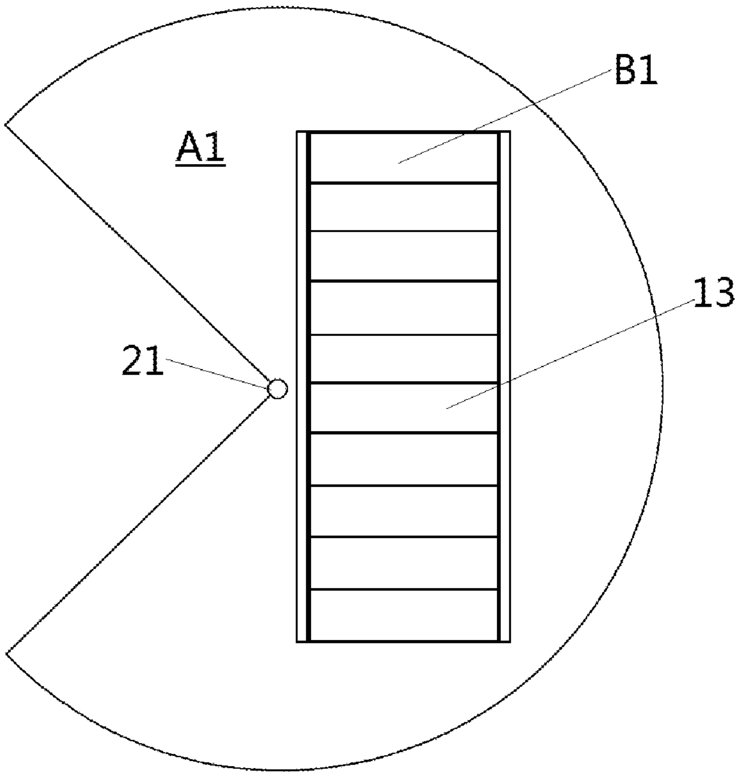
FIG. 3 shows a top view of a middle section of an automatic conveying device according to an embodiment of the present invention.
Figure 4:
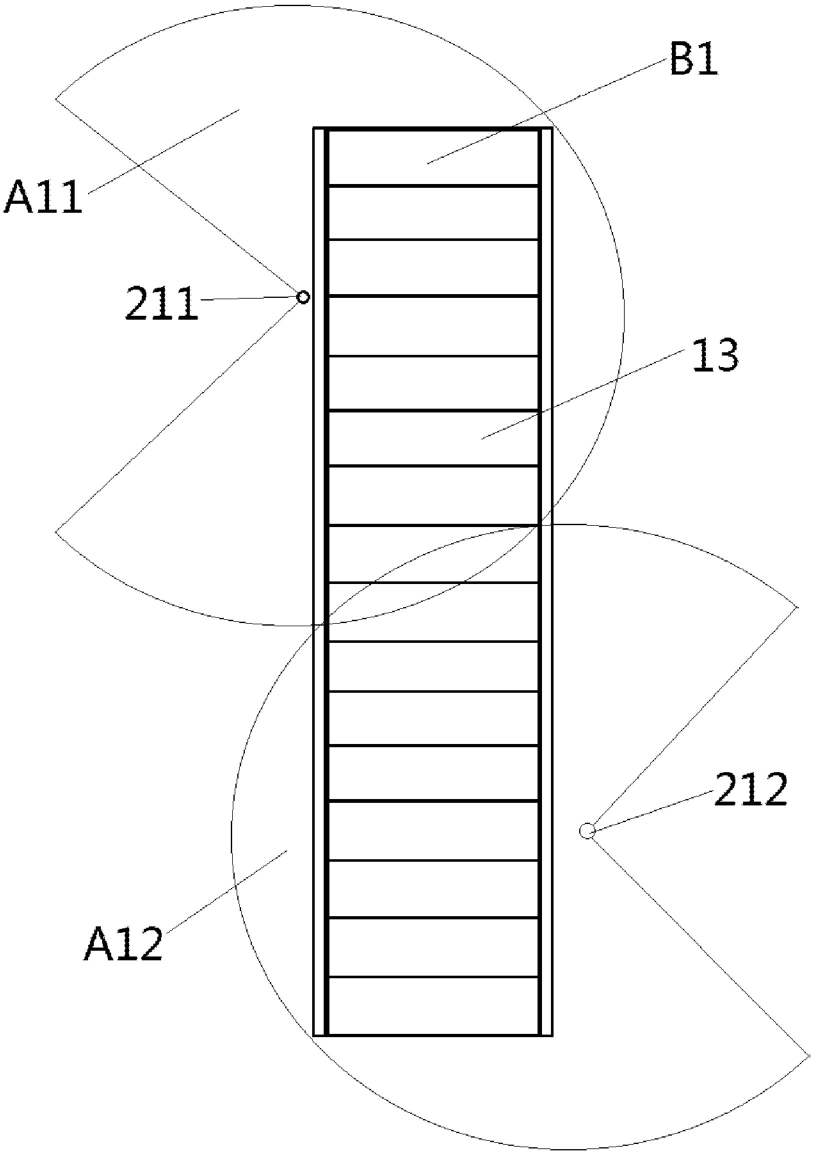
FIG. 4 shows a top view of a middle section of an automatic conveying device according to another embodiment of the present invention.

The automatic conveying device comprises: a first end 11 and a second end 12 opposite to each other at two target positions, and a middle section 13 between the first end 11 and the second end 12. In the context, the first end 11, the second end 12, and the middle section 13 refer to the standing positions of the automatic conveying device, such as the exposed portions of step boards, but do not include any associated components of the automatic conveying device, such as handrails, sideplates, and the like. In the case of an escalator, the first end 11 and the second end 12 are located at the lower and higher floors, respectively, while the middle section 13 is an inclined section connecting the lower and higher floors. In addition, the automatic conveying device also comprises one or more first detection devices 21 arranged on one or both sides of the automatic conveying device, and a processor (not shown) connected to the one or more first detection devices 21. One side or both sides of the automatic conveying device refer to the side face(s) of the step boards of the automatic conveying device, such as the left or right side of the step boards as shown in FIGS. 3 and 4, including located on the automatic conveying device or at a certain distance from the automatic conveying device. The detection range of each first detection device 21 is substantially a plane area, i.e., a certain area in a plane, and the detection range of each first detection device covers at least a portion of the middle section 13 (the standing portion, such as the step boards). The so-called "cover" the middle section 13 refers to that the vertical projection of the detection range on the reference plane B1 defined by the middle section 13 covers the middle section 13. For example, in the embodiment shown in FIG. 3, the projection of the detection range A1 of a single first detection device 21 on the reference plane B1 covers the entire middle section 13. In the embodiment shown in FIG. 4, the projection of the combination of the detection ranges A11 and A12 of the two first detection devices 211, 212 on the reference plane B1 covers the step boards of the entire middle section 13. The processor is connected to one or more first detection devices 21 to receive detection signals, and is configured to determine, based at least partially on the signals detected by the one or more first detection devices 21, the presence of external objects, such as human, pets, goods, or other objects, on the automatic conveying device.

In some embodiments, the detection range A1 of the first detection device (see FIG. 3) or a combination of the detection ranges A11 and A12 of a plurality of first detection devices 211, 212 (see FIG. 4) cover the entire middle section 13. In some embodiments, one or more first detection devices 21 are radar units, such as LiDARs. In some embodiments, the detection range of each first detection device 21 is substantially a fan-shaped plane area as shown in FIGS. 3 and 4, where the corresponding central angle of the fan-shaped plane area can be greater than 180 degrees, for example, between 180 degrees and 270 degrees. In the embodiment shown in FIG. 4, the areas of the middle section 13 covered by the two first detection devices 211, 212 do not overlap substantially. In alternative embodiments, two or more detection devices can also be arranged, so that the areas of the middle section covered by them partially overlap, thereby achieving redundancy in the detection signals. That is, a plurality of detection devices are arranged for mutual corroboration, so as to avoid measurement errors and improve detection accuracy. This can also ensure continued operation in the event of failure of a single detection device.

Figure 2:
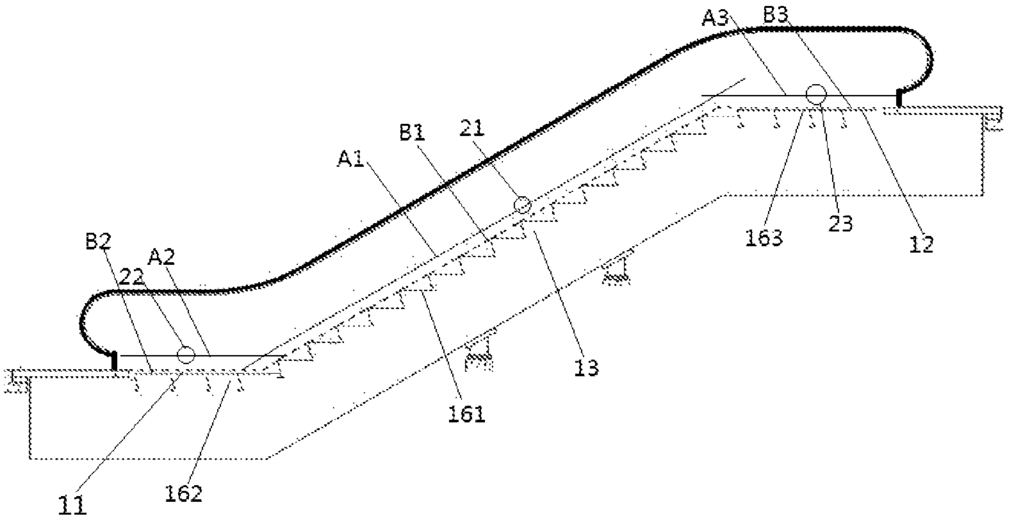
FIG. 2 shows a side view of an automatic conveying device according to an embodiment of the present invention.

In the case of a moving walkway (no matter horizontal or inclined), the middle section 13 itself forms a plane, so the reference plane B1 is the plane where the middle section 13 is located. In the case of an escalator, as shown in FIG. 2, the reference plane B1 can be defined as the plane formed by connecting the leading edges of the respective fully unfolded step boards 161. In some embodiments, the detection range of each first detection device may be arranged to be parallel to the reference plane B1. In the case of a plurality of first detection devices, the detection range of each first detection device can be parallel to the reference plane B1. Alternatively, some or all of the detection ranges of the first detection devices can be inclined to the reference plane B1, such as forming an angle within the range of 1 to 20 degrees. In some embodiments, the maximum distance between the effective area of the detection range of each first detection device (i.e., the area covering the step boards of the middle section) and the reference plane B1 may be the same or different. In some embodiments, the maximum distance between the effective area of the detection range of each first detection device and the reference plane B1 may be less than 1 meter or less than 0.5 meters. The radius of the fan-shaped detection plane of a first detection device 21 can reach 20 meters or more, so a single first detection device can cover a middle section 13 having a length more than 30 meters or even close to 40 meters. In the case of a general escalator, only one first detection device 21 can be arranged, or two first detection devices 21 can be arranged opposite to each other as redundancy. In the case of an escalator that spans multiple floors or a relatively long moving walkway, a plurality of first detection devices 21 or a plurality of sets of first detection devices 21 may be distributed along the entire length of the middle section.

In some embodiments, the automatic conveying device is a horizontal or an inclined moving walkway. Since the step boards at the first and second ends of the moving walkway are in the same plane as the step boards in the middle section, the detection range of the first detection device or the combination of the detection ranges of the first detection devices also covers the step boards at the first and second ends of the moving walkway.

Figure 1:
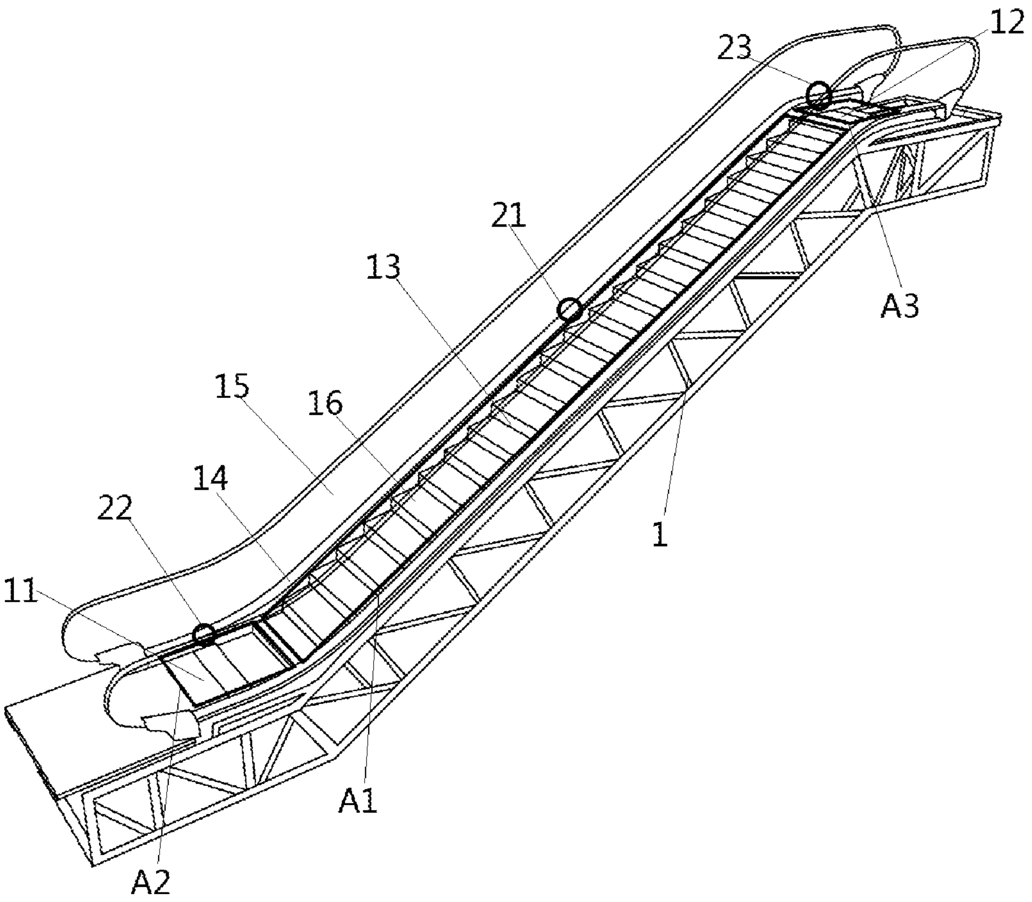
FIG. 1 shows a three-dimensional view of an automatic conveying device according to an embodiment of the present invention.

In some embodiments, if the automatic conveying device is an escalator as shown in FIGS. 1 and 2, the reference planes B2 and B3 of the step boards 162, 163 respectively at the first end 11 and the second end 12 of the automatic conveying device are not parallel to the reference plane B1 of the step boards in the middle section 13. In this case, the automatic conveying device further comprises: one or more second detection devices 22 and one or more third detection devices 23, where the detection range A2 of the one or more second detection devices 22 is a plane area covering the first end 11, and the detection range A3 of the one or more third detection devices 23 is a plane area covering the step board 163 of the second end 12. Similarly, one or more second detection devices 22 and one or more third detection devices 23 may be radar units, such as LiDARs. The one or more second detection devices and the one or more third detection devices each have a detection range of a fan-shaped plane area. Alternatively, since the areas required to be covered respectively by the one or more second detection devices 22 and the one or more third detection devices 23 are relatively small, a detection device based on beams or light curtain can also be selected. Accordingly, the processor is configured to determine the presence of external objects on the automatic conveying device based on signals detected by one or more first detection devices, the one or more second detection devices, and one or more third detection devices.

Figure 5:
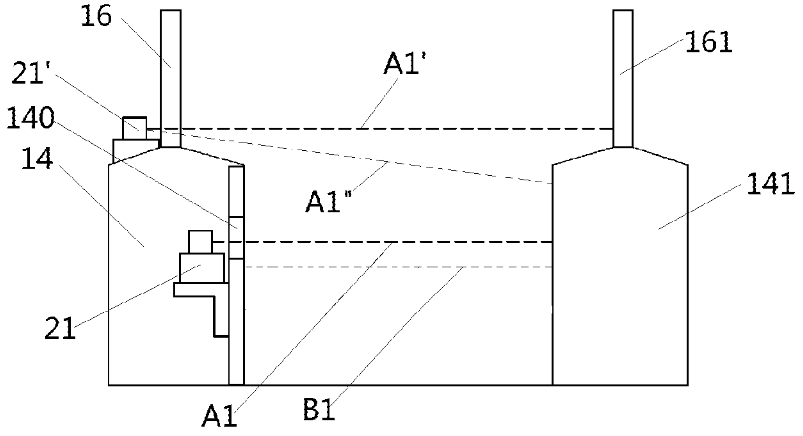
FIG. 5 shows a cross-sectional view of an automatic conveying device according to an embodiment of the present invention.

With continued reference to FIG. 5, one or more first detection devices are arranged inside the skirt panel(s) 14 on one or both sides of the automatic conveying device, and the skirt panel 14 comprises a transparent window strip 140 extending in a direction parallel to the reference plane, which is, for example, made of glass or transparent plastic, so that the skirt panel 14 does not block the detection range A1 of the first detection device 21. Although not shown, the same arrangement can also be present in a skirt panel 141 on the opposite side. Alternatively, a first detection device 21' can be arranged outside and on the skirt panel(s) 14 on one or both sides of the automatic conveying device and on the outer side of the transparent sideplate 16. Alternatively, another first detection device can be arranged on the outer side of the transparent sideplate 161 on the opposite side. As shown in the figure, the detection range A1, A1' of the first detection device 21, i.e., the fan-shaped plane area can be parallel to the reference plane B1. However, as mentioned earlier, in alternative embodiments, the detection range A1" of the first detection device 21', i.e., the fan-shaped plane area can be inclined to the reference plane B1. Although only the inclination in the cross-section of the automatic conveying device is shown in the figure, alternatively, the plane area of the fan-shaped plane area can also be inclined to the reference plane B1 in the longitudinal section. Although in the embodiment shown in FIG. 5, one or more first detection devices are arranged on the automatic conveying device, alternatively, one or more first detection devices can also be arranged at fixed positions that are spaced apart from the automatic conveying device, such as on the wall.

In some embodiments, the processor is configured to determine, upon receiving a start-up command, whether an external object is present on the automatic conveying device. If no external object is present, the automatic conveying device is started, and if an external object is present, the automatic conveying device is not started. Such a judgment process can be repeated several times at certain intervals before starting the automatic conveying device. If it is determined through multiple judgments that there is an external object, relevant personnel can be notified. The processor can be programmed to set the effective area of the detection ranges of one or more first detection devices (i.e., the area covering the step boards of the middle section), and determine whether an external object is present based on the detection signals in the effective area, while filtering the detection signals in the non-effective range. Such filtering method is known in the art.

According to another aspect of the present invention, a method for detecting the presence of an external object on an automatic conveying device is provided, comprising: arranging one or more first detection devices on one or both sides of the automatic conveying device, where each first detection device has a detection range that is substantially a plane area, and the detection range of each first detection device covers at least a portion of the middle section; and determining, based at least partially on signals detected by the one or more first detection devices, the presence of an external object on the automatic conveying device.

In some embodiments, the detection range of one first detection device or a combination of detection ranges of a plurality of first detection devices covers the entire middle section. In some embodiments, the method further comprises: covering a first end and a second end of the automatic conveying device with the detection range of the one first detection device or the combination of detection ranges of the plurality of first detection devices when the automatic conveying device is a moving walkway. In some embodiments, the method further comprises: arranging one or more second detection devices at a first end of the escalator, and arranging one or more third detection devices at a second end of the escalator when the automatic conveying device is an escalator, where the detection range of the one or more second detection devices is a plane area covering the first end, and the detection range of the one or more third detection devices is a plane area covering the second end; and determining the presence of an external object on the automatic conveying device based on the signals detected by the one or more first detection devices, the one or more second detection devices, and the one or more third detection devices.

According to another aspect, an automatic start method for an automatic conveying device is provided, comprising: determining, upon receiving a start-up command, the presence of an external object on the automatic conveying device using the method according to the embodiments of the present invention; and starting the automatic conveying device if no external object is present, and not starting the automatic conveying device if an external object is present.

It should be appreciated that the method of detecting the presence of an external object on the automatic conveying device according to the present invention is not limited to the automatic start of the automatic conveying device, while it can also be applied for other purposes, such as detecting the number of passengers during operation to determine the intensity of passengers on the automatic conveying device.

The specific embodiments described above in the present application are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. An automatic conveying device, comprising:

a first end and a second end opposite to each other; and a middle section between the first end and the second end;

wherein, the automatic conveying device further comprises one or more first detection devices arranged on one or both sides of the automatic conveying device, where each first detection device has a detection range that is substantially a plane area, and the detection range of each first detection device covers at least a portion of the middle section; and a processor connected to the one or more first detection devices, and configured to determine, based at least partially on signals detected by the one or more first detection devices, whether an external object is present on the automatic conveying device;

the processor is configured to determine, upon receiving a start-up command, whether an external object is present on standing positions of the automatic conveying device, where if no external object is present on the standing positions of the automatic conveying device, the automatic conveying device is started, and if an external object is present on the standing positions of the automatic conveying device, the automatic conveying device is not started.

2. The automatic conveying device according to claim 1, wherein a detection range of one first detection device or a combination of detection ranges of a plurality of first detection devices covers the entire middle section.

3. The automatic conveying device according to claim 2, wherein the one or more first detection devices are radar units, where the detection range of each first detection device is substantially a fan-shaped plane area.

4. The automatic conveying device according to claim 1, wherein the detection range of each first detection device is parallel to a reference plane of the middle section, and/or a maximum distance between the detection range of each first detection device and the reference plane is less than 1 meter or less than 0.5 meters, where the reference plane of the middle section is a plane where the middle section is located or a plane obtained by connecting leading edges of step boards of the middle section.

5. The automatic conveying device according to claim 1, wherein the automatic conveying device is a moving walkway with the first end, the second end, and the middle section located in the same plane, where the detection range of the one first detection device or the combination of plurality of first detection devices also covers the first end and the second end of the moving walkway.

6. The automatic conveying device according to claim 1, wherein the automatic conveying device is an escalator, the automatic conveying device further comprising: one or more second detection devices and one or more third detection devices, where a detection range of the one or more second detection devices is a plane area covering the first end, and a detection range of the one or more third detection devices is a plane area covering the second end.

7. The automatic conveying device according to claim 6, wherein the one or more second detection devices and the one or more third detection devices are radar units, where a detection range of each of the one or more second detection devices and the one or more third detection devices is substantially a fan-shaped plane area.

8. The automatic conveying device according to claim 6, wherein the processor is configured to determine, based on signals detected by the one or more first detection devices, the one or more second detection devices, and the one or more third detection devices, whether an external object is present on the automatic conveying device.

9. The automatic conveying device according to claim 1, wherein the one or more first detection devices are arranged inside skirt panels on one or both sides of the automatic conveying device, and the skirt panels comprise transparent window strips extending in a direction parallel to the reference plane, so that the skirt panels do not block the detection range of the first detection device(s).

10. The automatic conveying device according to claim 1, wherein the first detection device is arranged outer side of the skirt panel(s) on one or both sides of the automatic conveying device and on an outer side of the transparent sideplate on the skirt panel(s).

11. An automatic start method for an automatic conveying device, comprising:

arranging one or more first detection devices on one or both sides of the automatic conveying device, where each first detection device has a detection range that is substantially a plane area, and the detection range of each first detection device covers at least a portion of the middle section; and upon receiving a start-up command, determining, based at least partially on signals detected by the one or more first detection devices, whether an external object is present on standing positions of the automatic conveying device;

starting the automatic conveying device if no external object is present on standing positions of the automatic conveying device, and not starting the automatic conveying device if an external object is present on standing positions of the automatic conveying device.

12. The method according to claim 11, wherein a detection range of one first detection device or a combination of detection ranges of a plurality of first detection devices covers the entire middle section.

13. The method according to claim 12, further comprising: covering a first end and a second end of the automatic conveying device with the detection range of the one first detection device or the combination of detection ranges of the plurality of first detection devices when the automatic conveying device is a moving walkway.

14. The method according to claim 12, further comprising: when the automatic conveying device is an escalator, arranging one or more second detection devices at a first end of the escalator, and arranging one or more third detection devices at a second end of the escalator, where a detection range of the one or more second detection devices is a plane area covering the first end, and a detection range of the one or more third detection devices is a plane area covering the second end; and determining, based on signals detected by the one or more first detection devices, the one or more second detection devices, and the one or more third detection devices, whether an external object is present on the automatic conveying device.

* * * * *